(12) United States Patent
Schoke

(10) Patent No.: US 9,266,143 B2
(45) Date of Patent: *Feb. 23, 2016

(54) FIREPROOF BULKHEAD OF A HIGHLY POROUS STRUCTURE WITH INTUMESCENT COATING AND METHOD FOR ITS PRODUCTION

(71) Applicant: AIRBUS OPERATIONS GMBH, Hamburg (DE)

(72) Inventor: Berend Schoke, Twistringen (DE)

(73) Assignee: Airbus Operations GmbH, Hamburg (DE)

( * ) Notice: Subject to any disclaimer, the term of this patent is extended or adjusted under 35 U.S.C. 154(b) by 205 days.

This patent is subject to a terminal disclaimer.

(21) Appl. No.: 14/163,673

(22) Filed: Jan. 24, 2014

(65) Prior Publication Data

US 2014/0196390 A1    Jul. 17, 2014

Related U.S. Application Data

(63) Continuation of application No. 11/897,321, filed on Aug. 30, 2007, now Pat. No. 8,651,423.

(60) Provisional application No. 60/842,688, filed on Sep. 6, 2006.

(30) Foreign Application Priority Data

Sep. 6, 2006 (DE) .......................... 10 2006 042 220
Nov. 23, 2006 (DE) .......................... 10 2006 055 377

(51) Int. Cl.
    *B64C 1/10*       (2006.01)
    *B05D 1/18*       (2006.01)
(Continued)

(52) U.S. Cl.
CPC . *B05D 1/18* (2013.01); *A62C 2/065* (2013.01); *A62C 3/08* (2013.01); *B05D 1/02* (2013.01); *B29C 41/02* (2013.01); *B64C 1/10* (2013.01); *B64D 45/00* (2013.01); *B64G 1/52* (2013.01);
(Continued)

(58) Field of Classification Search
CPC ............ B64C 1/10; B64C 1/40; B64D 45/00; B64G 1/52; B64G 1/58; A62C 3/08; A62C 2/065
See application file for complete search history.

(56) References Cited

U.S. PATENT DOCUMENTS

| 3,508,599 A | 4/1970 | Vordahl |
| 3,934,066 A | 1/1976 | Murch |

(Continued)

FOREIGN PATENT DOCUMENTS

| GB | 2238283 | 5/1991 |
| WO | WO 0078547 | 12/2000 |
| WO | WO 2004004837 | 1/2004 |

OTHER PUBLICATIONS

German Office Action for U.S. Appl. No. 11/897,321 dated Mar. 7, 2007.

(Continued)

*Primary Examiner* — Tien Dinh
*Assistant Examiner* — Richard R Green
(74) *Attorney, Agent, or Firm* — Jenkins, Wilson, Taylor & Hunt, P.A.

(57) ABSTRACT

The present invention provides a fireproof bulkhead, having a highly porous structure with an intumescent coating, the highly porous structure being formed as a reticulated foam or as a highly porous pimple or nub structure.

15 Claims, 2 Drawing Sheets

(51) Int. Cl.
    A62C 2/06    (2006.01)
    A62C 3/08    (2006.01)
    C09K 21/02   (2006.01)
    B29C 41/02   (2006.01)
    B64D 45/00   (2006.01)
    B64G 1/52    (2006.01)
    B05D 1/02    (2006.01)

(52) U.S. Cl.
    CPC ......... *C09K 21/02* (2013.01); *Y10T 428/24997* (2015.04); *Y10T 428/249953* (2015.04); *Y10T 428/249969* (2015.04)

(56) References Cited

U.S. PATENT DOCUMENTS

| | | |
|---|---|---|
| 4,529,742 A | 7/1985 | Von Bonin et al. |
| 5,091,243 A | 2/1992 | Tolbert et al. |
| 5,098,284 A | 3/1992 | Van der Veen |
| 5,833,321 A | 11/1998 | Kim et al. |
| 6,449,963 B1 | 9/2002 | Ng et al. |
| 6,491,254 B1 | 12/2002 | Walkinshaw et al. |
| 6,811,122 B2 | 11/2004 | Aramburu et al. |
| 7,766,276 B2 | 8/2010 | Buchholz et al. |
| 8,651,423 B2 * | 2/2014 | Schoke .................. B64D 45/00 244/121 |
| 2002/0160178 A1 | 10/2002 | French et al. |
| 2004/0002559 A1 | 1/2004 | Troutman et al. |
| 2005/0246973 A1 | 11/2005 | Jensen |
| 2008/0302544 A1 | 12/2008 | Eskind et al. |
| 2014/0212652 A1 | 7/2014 | Schoke |

OTHER PUBLICATIONS

Banhart, John et al. "Cellular Metals", 2003.
Non-Final Office Action for U.S. Appl. No. 14/163,664 dated Feb. 5, 2015.
Non-Final Office Action for U.S. Appl. No. 11/897,321 dated Oct. 4, 2010.
Final Office Action for U.S. Appl. No. 11/897,321 dated Mar. 8, 2011.
Non-Final Office Action for U.S. Appl. No. 11/897,321 dated Oct. 5, 2011.
Final Office Action for U.S. Appl. No. 11/897,321 dated May 22, 2012.
Non-Final Office Action for U.S. Appl. No. 11/897,321 dated Dec. 19, 2012.
Final Office Action for U.S. Appl. No. 11/897,321 dated Aug. 1, 2013.
Final Office Action for U.S. Appl. No. 14/163,664 dated Jul. 21, 2015.

* cited by examiner

FIREPROOF BULKHEAD OF A HIGHLY POROUS STRUCTURE WITH INTUMESCENT COATING AND METHOD FOR ITS PRODUCTION

CROSS-REFERENCE TO RELATED APPLICATION

This application is a continuation of and claims priority to U.S. patent application Ser. No. 11/897,321 filed Aug. 30, 2007, the entire disclosure of which is herein incorporated by reference.

TECHNICAL FIELD

The present invention relates to a highly porous structure with an intumescent coating, which is used as a fireproof bulkhead in aircraft construction, and to the production of such a fireproof bulkhead.

BACKGROUND

The requirements for materials that are used in modern aircraft construction are continually increasing as a result of ever new regulations and changing requirements for the aircraft. For example, the requirements that an aircraft has to meet after a crash landing in which a fire breaks out, known as a post-crash fire, are becoming more stringent as a result of new regulations. The occupants must be protected from the flames attacking from the outside for a predetermined period of time that is sufficient to allow the passenger compartment to be evacuated.

The improved protection of the passenger compartment may be obtained by reinforcing the fuselage and also the secondary structure. However, this usually entails an increase in weight. However, a weight increase is undesired, in particular in the case of aircraft construction. Especially the hold in the lower region of an aircraft, produced from lightweight materials such as glass fibers and phenolic resins, offers only little protection to flames attacking from the outside. In order to improve the protection of the passenger compartment here, additional fireproof bulkheads can be introduced. These fireproof bulkheads are fitted between the lower region of the passenger compartment and the hold.

However, fireproof bulkheads that are to be fitted in this region have to meet special requirements. On the one hand, they must provide effective protection of the passenger compartment in the event of a fire. On the other hand, the free circulation of air around the hold must be ensured. This is necessary in particular when there is a sudden drop in pressure in the aircraft. If a high circulation of air cannot be ensured, there is the risk of the aircraft being torn apart if there is a sudden drop in pressure caused by damage to the outer skin of the aircraft, due to the great differences in pressure that cannot be equalized quickly enough.

The structures used until now as fireproof bulkheads in the aircraft substantially comprise mechanical flap structures, which close in the event of a fire, or deflector plates arranged in the form of a cascade.

Of these, flap structures have the disadvantage that, in the case of complicated geometries, they can only be realized with difficulty and, moreover, are accompanied by high weight and, on account of their mechanics, are susceptible to malfunctions or failures.

Deflector plates arranged in the form of a cascade have the disadvantage that they cannot completely separate the different regions.

A construction which normally ensures a high level of air permeability but at the same time can serve effectively as a fireproof bulkhead in the event of a fire, and along with that achieves a low weight, cannot be provided by either of the two types of fireproof bulkhead used so far in aircraft construction.

SUMMARY

The present invention therefore has the object of providing a material which has a high level of air permeability but in the event of a fire can serve as a fireproof bulkhead and, moreover, has a low weight.

This object is achieved according to the invention by a fireproof bulkhead with features according to the present disclosure and appended claims.

A first aspect of the present invention concerns a fireproof bulkhead, comprising a highly porous structure with an intumescent coating, the highly porous structure being a reticulated foam or a highly porous pimple or nub structure. The highly porous structure must in this case perform various tasks.

Firstly, the highly porous structure must have very good permeability to gases, such as for example air. A high level of permeability to gases ensures that gases, such as for example air, can flow unhindered through the highly porous structure. The highly porous structure does not represent any obstacle to a flowing gas, in particular a rapidly flowing gas. This is important in particular in the event of a drop in pressure in the aircraft, in order to avoid bursting of the aircraft. Ideally, the highly porous structure does not offer any resistance, or any appreciable resistance, to an air stream.

Secondly, the highly porous structure must not have any appreciable weight. In particular in the case of aircraft construction, the greatest attention must be paid to weight saving. Structures which, while of a low weight, can at the same time still undertake a load-bearing function are used in aircraft construction.

A further, important feature that the highly porous structure must have is the bearing of an intumescent coating. It must be possible for the intumescent coating to be easily applied to the highly porous structure. In particular in the intumesced state, i.e. when the intumescent coating has turned into a thermal foam in the event of a fire, the highly porous structure must offer sufficient restraint and stability to the swollen, i.e. intumesced, coating in order that it can be kept in situ by the pressure of the flames. The flames must not detach the thermal foam from the structure by the pressure which they build up, and thereby separate the structure and the foam, since effective damping of the flames is then not possible.

A reticulated metallic foam is particularly advantageous here as the highly porous structure. A reticulated foam differs decisively in its properties from a normal foam. When a foam is reticulated, the cell membranes of the foam are removed virtually completely. This makes the cells as open as possible, which ensures extremely low flow resistance to gases, such as for example air.

For the reticulation, a conventional foam of polymer material is introduced into a steel chamber. After exchanging the air for a fuel gas mixture, the latter is ignited. When it is ignited, the cell membranes are torn apart by the heat and pressure wave produced and melt down to the cell walls. As a result, the cell walls are strengthened and the flow resistance to gases is reduced on account of the absence of the cell membranes.

On account of the reduced flow resistance to gases and the nevertheless stable structure, reticulated foams are particularly suitable for serving as a carrier for an intumescent coating and keeping the swollen thermal foam in situ in the event of a fire. A simple grid structure, such as for example a wire grid, cannot provide an adequate structure for a thermal foam to support it in the event of a fire and to ensure that the thermal foam is not blown away by the pressure of the fire occurring.

According to a further development, the reticulated foam is a reticulated metallic foam. The applicant is so far only familiar with such foams as heat exchangers, filters, catalyst surfaces, weight-saving structural elements or deformable energy absorbers. It is not, however, familiar so far with them being used as a carrier for an intumescent coating which is fixed in the swollen state by the reticulated metal structure. The coated, reticulated metallic structures advantageously have excellent permeability properties, in particular with respect to gases, such as for example air.

Serving for example as a starting point for metallic foams are reticulated polyurethane foams. These foams can be easily brought into the desired outer form. To transform the reticulated polyurethane foams into reticulated metallic foams, a special casting method is used. The reticulated polyurethane foam is filled with a ceramic material. After removing the organic component, a negative form remains, which is filled with liquid metal, such as for example aluminum, copper or zinc. After careful removal of the ceramic materials, an articulated metallic foam remains. A high-quality cell structure with 2-12 cells per centimetre is obtained.

Alternatively, an articulated foam of polymer material may be coated with a metal to produce a metallic structure. The coating may be performed for example by means of a chemical vapour deposition. It is optionally also possible, after an initial coating or other way of ionizing the surface, to use a galvanic method for depositing metals on the articulated structure of polymer material. A highly porous, reticulated metal foam is also obtained in this way.

According to a further development, the articulated metal foam may be coated with a ceramic. The ceramic coating provides the metal foam with further fire resistance. Moreover, the ceramic surface can be coated more easily with an intumescent coating.

Suitable metallic materials for a reticulated foam are aluminum, copper, zinc and titanium or their alloys.

Apart from reticulated foams, pimple or nub structures may also be used as carrier materials for an intumescent coating. The pimple or nub structures have the advantage here that they can be additionally used as structural elements that transfer relatively great forces.

To produce a pimple or nub structure, woven, knitted and/or laid fabrics of fibers are thermoformed over templates. Fibers which can easily be stretched can be used suitably. However, other fibers, such as for example glass fibers, in particular quartz glass fibers, or aramid fibers may also be used. To produce nubbed honeycombs, for example, first a knitted or laid fabric of partially stretched fibers, for example polyester, is thermoformed at an elevated temperature to form a nub structure. At the same time, the fibers are stretched. The thermoformed knitted or woven fabric may subsequently be impregnated with a reactive resin. After the thermoforming, it is already dimensionally stable sufficiently to retain its form during this working step. Alternatively, the knitted fabric may also be impregnated before the thermoforming, whereby a prepreg is obtained. The impregnated nubbed honeycombs may be provided with further outer layers and be cured together with them to form sandwich components.

By placing two layers of a pimple or nub structure one inside the other in an opposing fashion and adhesively bonding them, the specific properties of the structures can be further improved significantly.

Further working steps are necessary to produce such interlaced nub structures. Two pimple or nub structures are placed one inside the other, offset in relation to each other, the two layers being pressed one into the other with the aid of two tools with rubber studs, which engage in the nubs or pimples of the impregnated structure. The rubber studs become shorter and thicker during the pressing, so that they can reliably bond the nubs or pimples to one another even at the flanks. The tools are heated in order to cure the previously applied reactive resin and consequently adhesively bond the structures.

The bonding of two pimple or nub structures has the effect that the specific compressive stiffness is more than trebled and the specific compressive strength more than doubled in comparison with the single pimple or nub structure.

Such structures are therefore advantageous in particular whenever relatively great forces have to be transferred. When quartz glass fibers are used, for example, an increased fire resistance can be provided. Moreover, a double-layered pimple or nub structure can easily keep an intumesced coating in situ, in order in this way to form an effective fireproof bulkhead. The great spacing between the fibers also allows a high level of permeability with respect to gases, in particular air, to be ensured.

To provide a fireproof bulkhead, the highly porous structures described above must be coated with an intumescent coating. Used for this according to the invention are coatings which are suitable on account of their low viscosity for the impregnating of highly porous structures without impairing the advantageous properties of the highly porous structure, in particular the high level of permeability to gases.

In the event of a fire, it is advantageous if the intumesced coating, i.e. the thermal foam produced, fills the highly porous structure completely. In the event of a fire, the carrier material merely serves the purpose of fixing this thermal foam. The intumesced coating, i.e. the thermal foam, protects the structural elements and similarly the areas lying behind the fireproof bulkhead from the flames.

According to a further development, the intumescent coating is resistant to hydrolysis. In an aircraft, materials are subjected to great differences in temperature. At the same time, in particular, water deposits may occur on solid structures as a result of condensation of moisture in the air. It can be ensured by the use of hydrolysis-resistant, intumescent coatings that the intumescent coating is not damaged by condensed water vapour as a result of hydrolysis.

The intumescent coating develops its intumescent effect (only) at a temperature above 200° C., preferably (only) above 400° C. and most preferably (only) above 600° C.

A further aspect of the present invention concerns an aircraft or spacecraft with a fireproof bulkhead.

According to one embodiment, the fireproof bulkhead in the aircraft or spacecraft is formed as a fire barrier for a baggage compartment.

In particular, the fireproof bulkhead of the present invention may be fitted to the sides of a hold of an aircraft or spacecraft.

A further aspect of the present invention concerns a method for producing a fireproof bulkhead such as that described above, with the steps of providing a highly porous structure, the highly porous structure being a reticulated foam or a highly porous pimple or nub structure, and coating the highly porous structure with an intumescent material.

According to one embodiment, the intumescent material is applied by spraying or by dip coating.

BRIEF DESCRIPTION OF THE DRAWINGS

In the figures, the same reference numerals designate components that are the same or functionally the same, unless otherwise indicated.

DETAILED DESCRIPTION

Examples

Example 1

On a very open-cell, reticulated foam of aluminum, a low-viscosity, hydrolysis-resistant, intumescent lacquer is applied, for example by spraying. After drying of the intumescent coating, the foam can be used as a fireproof bulkhead. During the intumescence of the coating into a thermal foam, the intumescent coating is anchored in the foam microstructure and completely closes the spaces lying between the cell walls.

According to the above example, a fireproof bulkhead according to the invention can likewise be produced by the open-cell foam of aluminum being replaced by an open-cell foam of slip-treated aluminum with a ceramic coating.

Example 2

Figure 1:
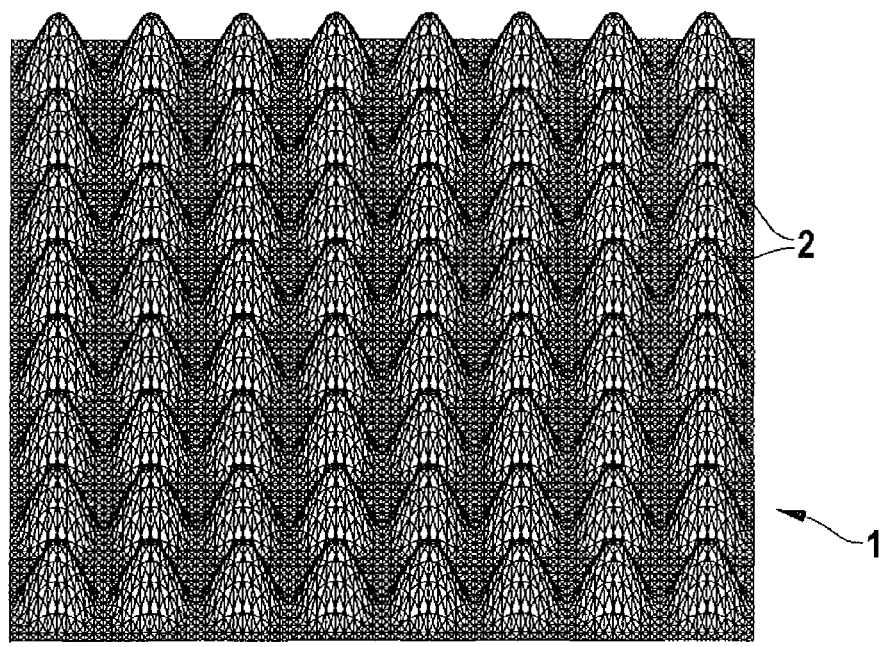
FIG. 1 shows a perspective view of a single-layered pimple structure according to an exemplary embodiment of the present invention.

An open-cell knitted fabric of a partially stretched polyester is thermoformed at elevated temperature to form a nub structure. After impregnating with a reactive resin, this reactive resin is cured at elevated temperature. FIG. 1 shows a nub structure 1 produced in such a way. Regularly arranged nubs are formed in the nub structure 1. The nub structure 1 is coated with an intumescent coating for example by immersion in a low-viscosity, hydrolysis-resistant, intumescent coating solution. After drying of the coating, the coated nub structure can be used as a fireproof bulkhead.

Figure 2:
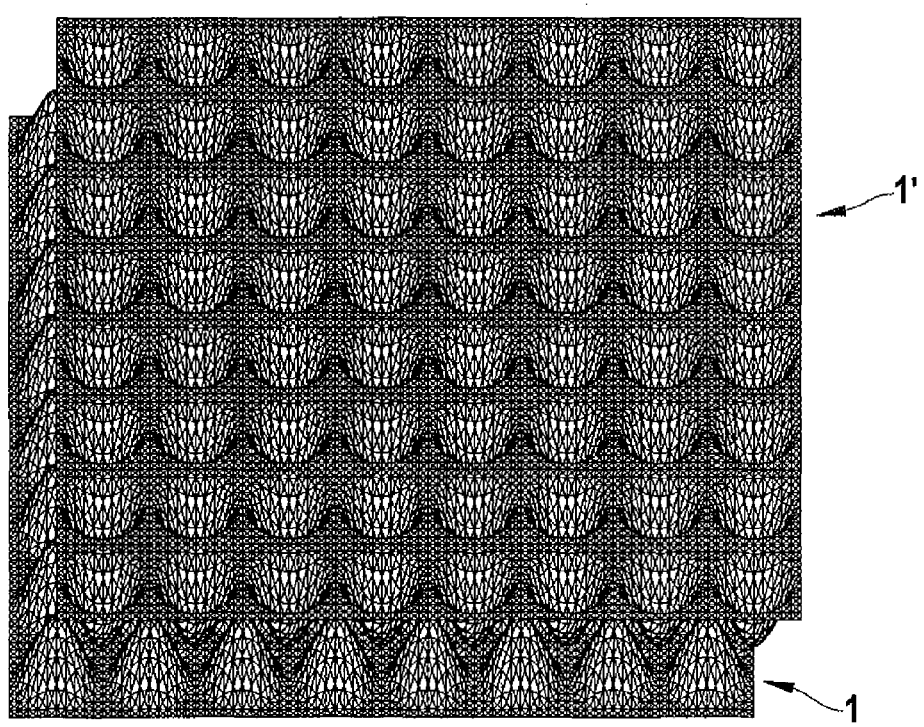
FIG. 2 shows a perspective view of a two-layered pimple structure according to an exemplary embodiment of the present invention.

FIG. 2 shows two interlaced nub structures 1, 1' as they have been produced in accordance with the above example. After coating with a reactive resin, the nub structures 1 and 1' are interlaced inversely with one another.

The nubs of the nub structure 1' thereby engage in the cavities that lie between the nubs of the nub structure 1. In this arrangement, the nubs of the two structures touch one another. The nubs or pimples of the respective nub structure are pressed one into the other by rubber studs in such a way that the structures are bonded to one another at elevated temperatures as the reactive resin cures. After coating the interlaced nub structure with a hydrolysis-resistant, intumescent coating by tip coating and drying of the coating, the structure produced in this way can be used as a fireproof bulkhead.

In a further exemplary embodiment, interlaced pimple structures of quartz glass fibers are produced in accordance with the above Example 2 and coated with an intumescent coating.

Figure 3:
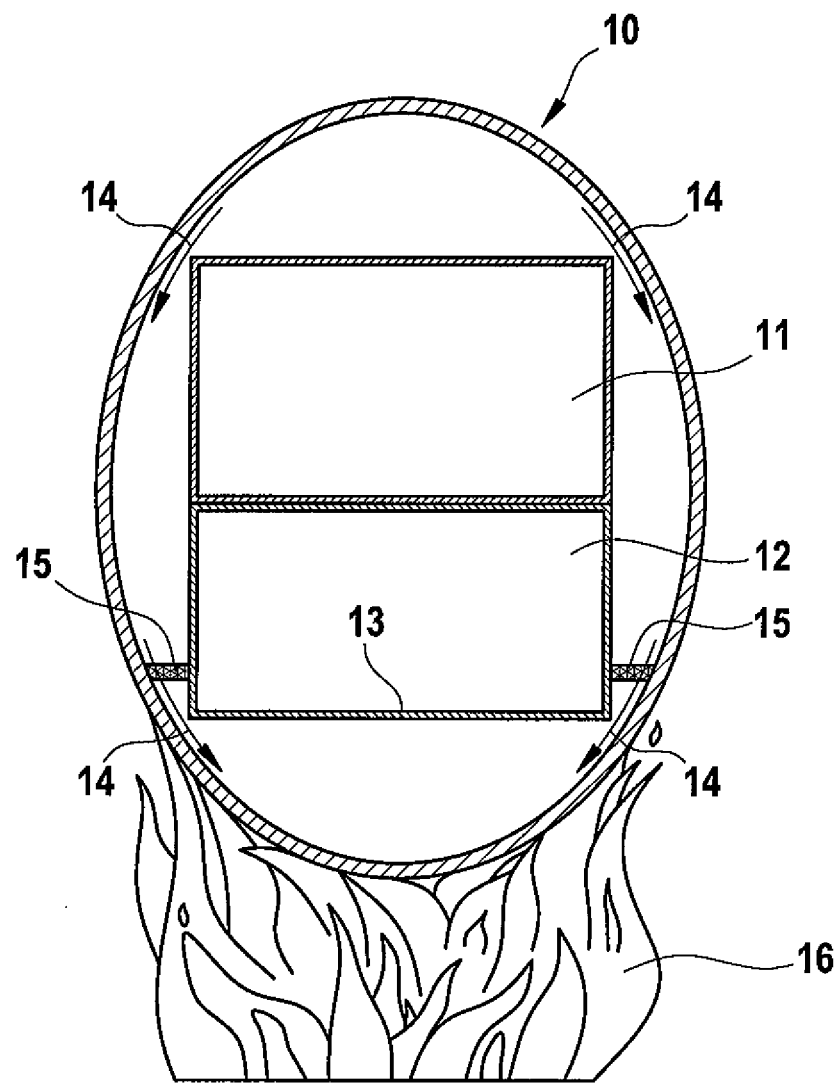
FIG. 3 shows a cross-sectional view through an aircraft fuselage with fireproof bulkheads according to an exemplary embodiment of the present invention.

The fireproof bulkheads of the present invention can be used in aircraft construction. FIG. 3 shows by way of example a cross section through a fuselage 10 of an aircraft. Integrated in the fuselage 10 are a cabin 11 and a hold 12. The hold 12 in this case lies underneath the cabin 11. Neither the cabin 11 nor the hold 12 is in contact with the fuselage 10 and so they allow a circulation of air on an air circulation path, indicated by the arrows 14 in FIG. 3, around the cabin 11 and the hold 12. In the event of a leak within the fuselage 10, a rapid pressure equalization must be possible. The cabin 11 and the hold 12 together form a unit around which a rapid circulation of air is to be made possible in the event of a leak occurring in the fuselage 10.

Furthermore, in the event of a fire occurring from the outside, the cabin 11 with the passengers in it must be protected from a fire. For this purpose, for example, the floor 13 of the hold is of a fire-retardant design. A possible source of fire 16 at the lower part of the fuselage is consequently hindered from advancing further in the direction of the cabin 11 by fire barrier devices in the floor 13 of the hold.

Since, however, areas to the side of the hold must be kept clear for possible air circulation 14, spreading of flames can take place along these air circulation paths represented by the arrows 14. Consequently, rapid advancement of the flames to the cabin 11 can no longer be prevented. According to the present exemplary embodiment, fireproof bulkheads 15 are fitted to the sides of the hold, in order to prevent advancement of the flames in the event of a fire. Since the fireproof bulkheads 15 also have a low resistance to air flowing through when there is no fire, the paths for the air circulation 14 are not affected, or only insignificantly, by the fireproof bulkheads 15. In the event of a fire, however, spreading of the flames on the paths provided for the air circulation is prevented or delayed by the fireproof bulkheads 15.

Although the present invention has been described in the present case on the basis of exemplary embodiments, it is not restricted to them but can be modified in various ways.

For example, it is conceivable to fit the fireproof bulkheads at a number of locations at which circulation of air is necessary when there is no fire, but effective protection from flames is to be provided in the event of a fire. However, it is also possible to fit the fireproof bulkheads at other locations in the aircraft or spacecraft.

The invention claimed is:

1. A fireproof bulkhead comprising a highly porous structure with an intumescent coating, the highly porous structure being formed as a highly porous pimple or nub structure, and the coating being applied to an inner surface of cell walls of the highly porous structure, wherein the highly porous structure has a high level of permeability to gases, and wherein the highly porous pimple or nub structure is produced by forming over a template.

2. The fireproof bulkhead according to claim 1, wherein the highly porous structure is formed as a highly porous pimple or nub structure and the highly porous pimple or nub structure comprises at least one of a woven and a laid fabric of fibers.

3. The fireproof bulkhead according to claim 2, wherein the fibers are at least one of glass fibers and polyester fibers.

4. The fireproof bulkhead according to claim 3, wherein the fibers are quartz glass fibers.

5. The fireproof bulkhead according to claim 1, wherein the intumescent coating is an intumescent lacquer.

6. The fireproof bulkhead according to claim 1, wherein the intumescent coating is resistant to hydrolysis.

7. The fireproof bulkhead according to claim 1, wherein the intumescent coating exhibits its intumescent effect at a temperature above 200° C.

8. The fireproof bulkhead according to claim 1, wherein the intumescent coating exhibits its intumescent effect at a temperature above 400° C.

9. The fireproof bulkhead according to claim 1, wherein the intumescent coating exhibits its intumescent effect at a temperature above 600° C.

10. Aircraft or spacecraft with a fireproof bulkhead according to claim 1.

11. The aircraft or spacecraft with a fireproof bulkhead according to claim 10, wherein the fireproof bulkhead is arranged to the sides of a hold of an aircraft or spacecraft, in order to fill the cavity between the hold and the fuselage of the aircraft or spacecraft.

12. A method for producing a fireproof bulkhead according to claim 1 comprising:
   providing a highly porous structure, the highly porous structure being formed as a highly porous pimple or nub structure; and
   coating the highly porous structure with an intumescent material, wherein the highly porous pimple or nub structure is produced by forming over a template.

13. The method for producing a fireproof bulkhead according to claim 12, wherein the coating is performed by spraying or dip coating.

14. The fireproof bulkhead according to claim 1, wherein the highly porous structure is formed as a highly porous pimple or nub structure and wherein two layers of a pimple or nub structure are placed one inside the other in an opposing fashion.

15. The fireproof bulkhead according to claim 1, wherein the intumescent coating fills the highly porous structure completely when thermal foam is produced.

* * * * *